(12) United States Patent
Bhanage et al.

(10) Patent No.: US 10,925,001 B2
(45) Date of Patent: Feb. 16, 2021

(54) MACHINE LEARNING-BASED TARGET WAKE TIME NEGOTIATION OPTIMIZATION FOR WIRELESS NETWORKS

(71) Applicant: Cisco Technology, Inc., San Jose, CA (US)

(72) Inventors: Gautam Dilip Bhanage, Milpitas, CA (US); Pooya Monajemi, Irvine, CA (US); Khashayar Mirfakhraei, Los Altos, CA (US); Ardalan Alizadeh, San Jose, CA (US); Xu Zhang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/407,447

(22) Filed: May 9, 2019

(65) Prior Publication Data

US 2020/0359327 A1  Nov. 12, 2020

(51) Int. Cl.
| | |
|---|---|
| *G08C 17/00* | (2006.01) |
| *H04W 52/02* | (2009.01) |
| *G06N 20/00* | (2019.01) |
| *G06N 3/02* | (2006.01) |
| *H04W 72/12* | (2009.01) |

(52) U.S. Cl.
CPC .......... *H04W 52/0248* (2013.01); *G06N 3/02* (2013.01); *G06N 20/00* (2019.01); *H04W 52/0229* (2013.01); *H04W 52/0235* (2013.01); *H04W 72/1236* (2013.01)

(58) Field of Classification Search
CPC ..... H04B 7/0452; H04L 5/0007; H04L 67/10; H04L 67/12; H04L 67/2833; H04W 4/08; H04W 4/70; H04W 52/0219; H04W 52/0248; H04W 52/0229; H04W 52/0235; H04W 72/1236
See application file for complete search history.

(56) References Cited

U.S. PATENT DOCUMENTS

| | | | |
|---|---|---|---|
| 7,508,781 B2 | 3/2009 | Liu et al. | |
| 7,551,948 B2 | 6/2009 | Meier et al. | |
| 2014/0135051 A1 | 5/2014 | Ghosh | |
| 2016/0219510 A1* | 7/2016 | Asterjadhi | .......... H04W 72/005 |
| 2017/0019853 A1 | 1/2017 | Ghosh et al. | |

(Continued)

OTHER PUBLICATIONS

U.S. Appl. No. 16/246,879, Unpublished (filed Jan. 14, 2019, Cisco Technology Inc.

(Continued)

*Primary Examiner* — Minh Trang T Nguyen
(74) *Attorney, Agent, or Firm* — Behmke Innovation Group LLC; Kenneth J. Heywood; Jonathon P. Western (57) ABSTRACT

In one embodiment, a device in a wireless network receives a target wake time (TWT) request from a wireless client. The device computes TWT parameters based on the received request. The device predicts, using the computed TWT parameters as input to a machine learning model, whether the computed TWT parameters will be accepted by the wireless client. The device provides the computed TWT parameters to the wireless client, based on a prediction by the machine learning model that the client will accept the computed TWT parameters.

17 Claims, 7 Drawing Sheets

(56) References Cited

U.S. PATENT DOCUMENTS

2018/0150125 A1* 5/2018 HomChaudhuri .. G06F 12/1009

OTHER PUBLICATIONS

U.S. Appl. No. 15/987,140, Unpublished (filed May 23, 2018), Cisco Technology Inc.
Nurchis et al., "Target Wake Time: Scheduled access in IEEE 802.11ax WLANs", https://arxiv.org/pdf/1804.07717.pdf, Apr. 20, 2018.
Lade et al., "802.11ax for internet of things machine learning assisted optimized power save techniques for iot devices using 802.11ax target wake time", www.tdcommons.org, Oct. 2, 2018, 9 pages.

* cited by examiner

MACHINE LEARNING-BASED TARGET WAKE TIME NEGOTIATION OPTIMIZATION FOR WIRELESS NETWORKS

TECHNICAL FIELD

The present disclosure relates generally to computer networks, and, more particularly, to machine learning-based target wake time negotiation optimization for wireless networks.

BACKGROUND

The Internet of Things, or "IoT" for short, represents an evolution of computer networks that seeks to connect many everyday objects to the Internet. Notably, there has been a recent proliferation of "smart" devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room, when a person enters the room. In contrast to many traditional computer networks, various challenges are presented with IoT devices, such as lossy links, low bandwidth, battery operation, low memory and/or processing capability of the device, etc.

One promising technology to address the limited resources of IoT devices is the target wake time (TWT) mechanism recently introduced under the 802.11ax wireless standard. Under TWT, a wireless client can negotiate with its access point specific time windows during which the client will wake and communicate with the access point. This allows the client to enter into a sleep mode when not communicating with the access point, thereby conserving power. However, this negotiation process is not guaranteed and can ultimately result in the client rejecting the parameters offered by the access point. When this occurs, the client may end up sending unscheduled traffic to the access point or even roam to another access point. In some extreme cases, the client may even blacklist the access point, if it cannot negotiate a TWT schedule with the access point.

DESCRIPTION OF EXAMPLE EMBODIMENTS

Overview

According to one or more embodiments of the disclosure, a device in a wireless network receives a target wake time (TWT) request from a wireless client. The device computes TWT parameters based on the received request. The device predicts, using the computed TWT parameters as input to a machine learning model, whether the computed TWT parameters will be accepted by the wireless client. The device provides the computed TWT parameters to the wireless client, based on a prediction by the machine learning model that the client will accept the computed TWT parameters.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
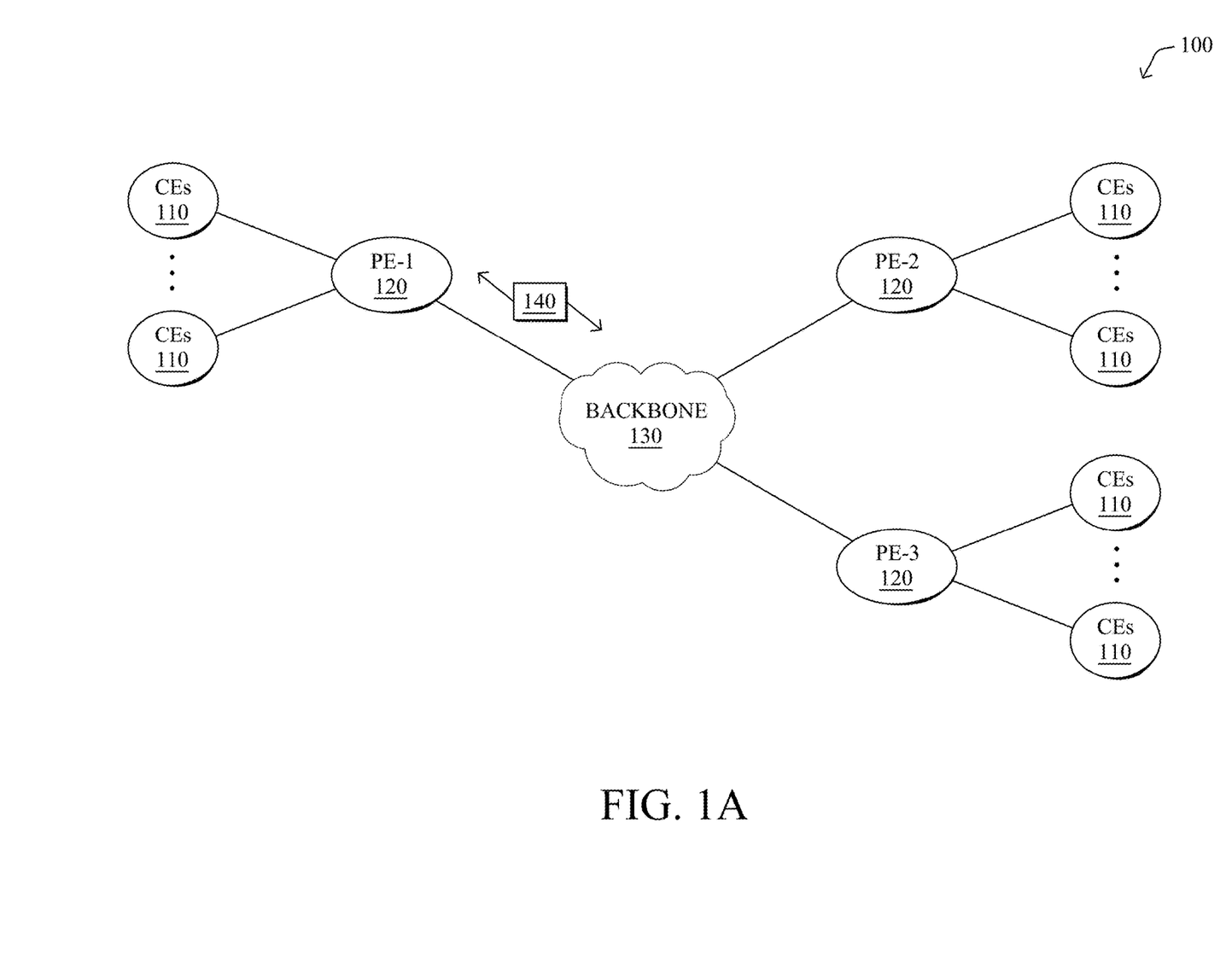
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
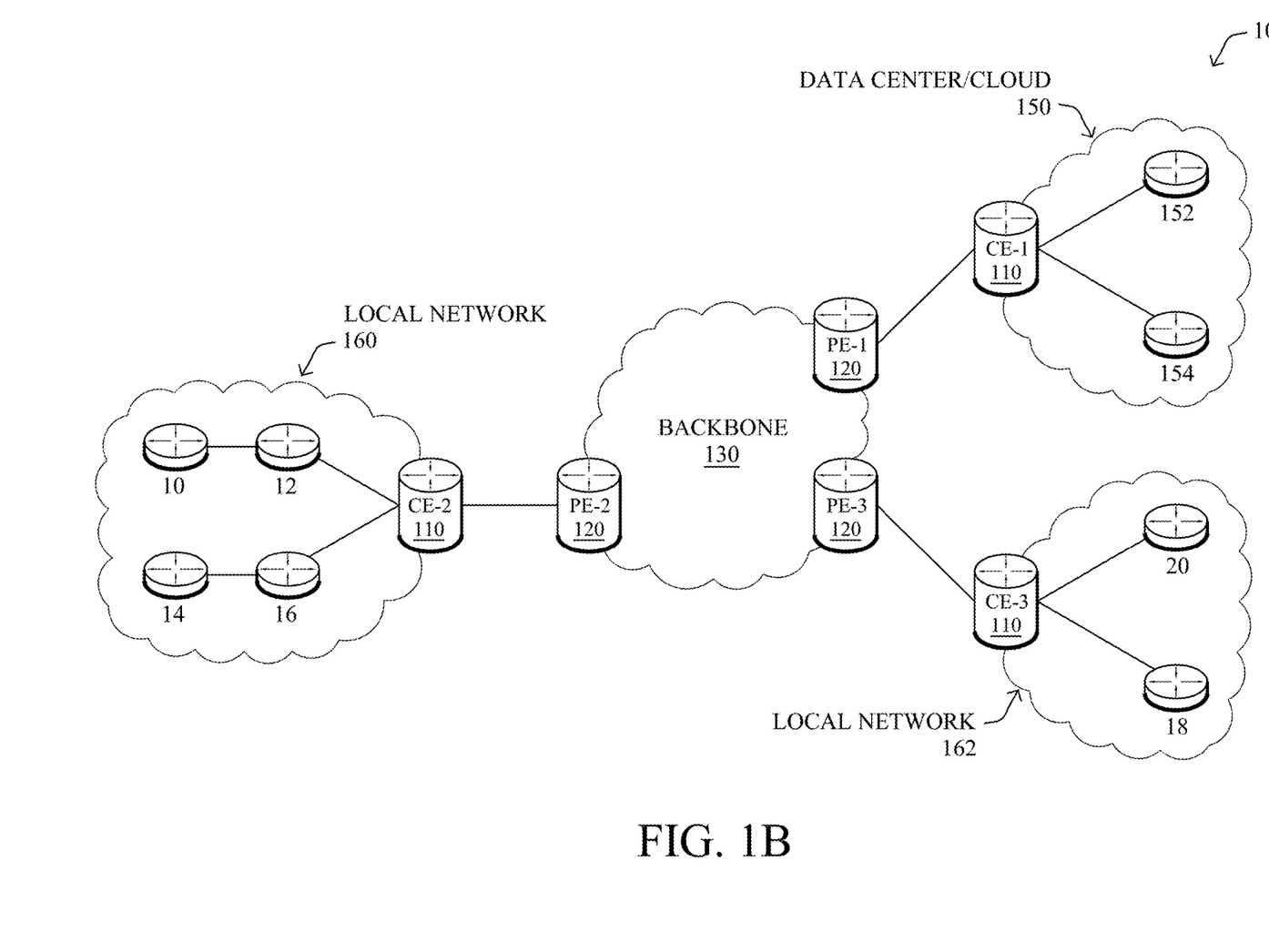

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather is the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
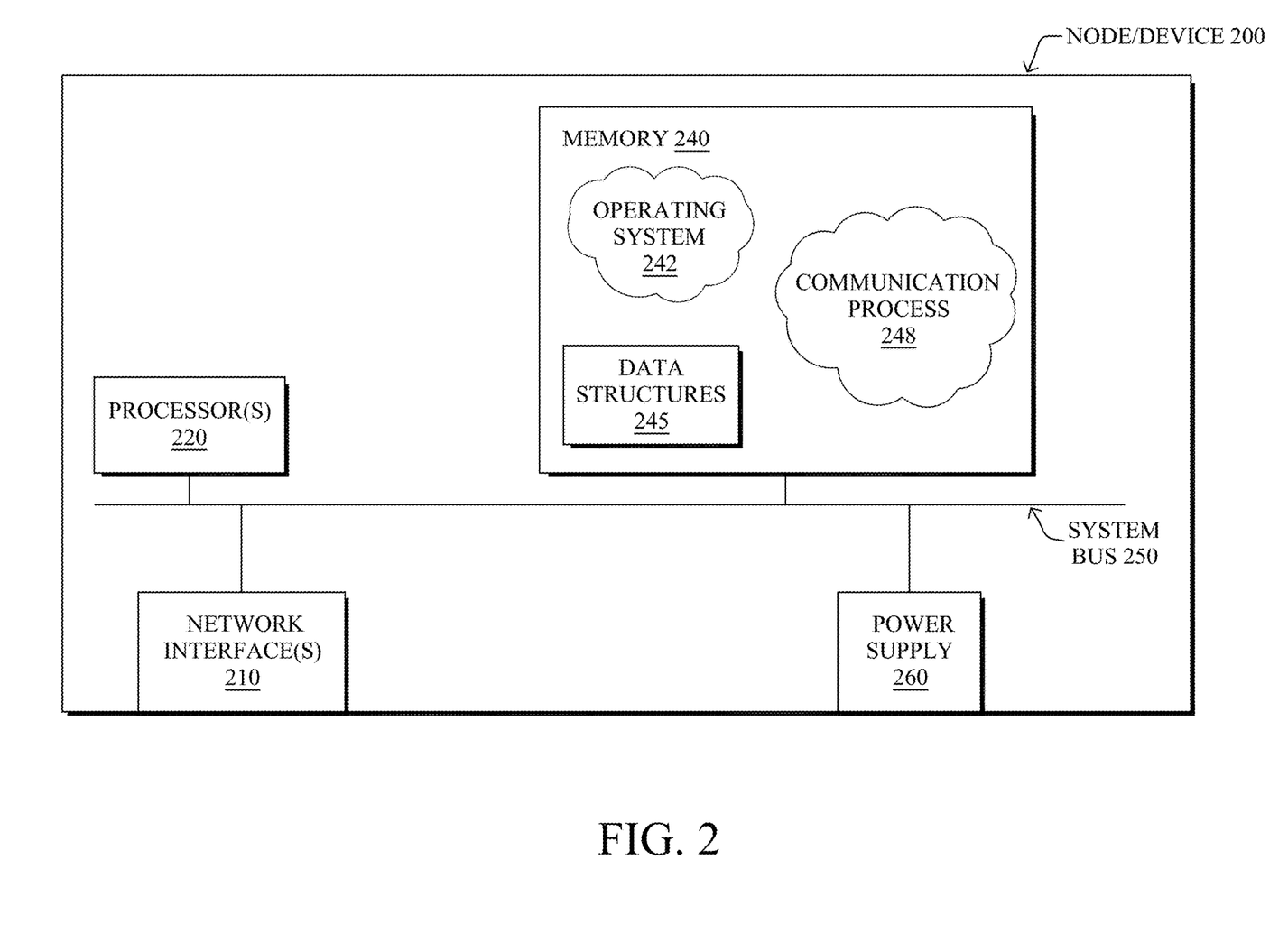
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., wireless access points, switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a communication process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments, communication process 248 may utilize machine learning techniques, to negotiate communications between a wireless network and a client of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data, as noted above, that is used to train the model to apply labels to the input data. For example, the training data may include sample parameters that are acceptable to a client and labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
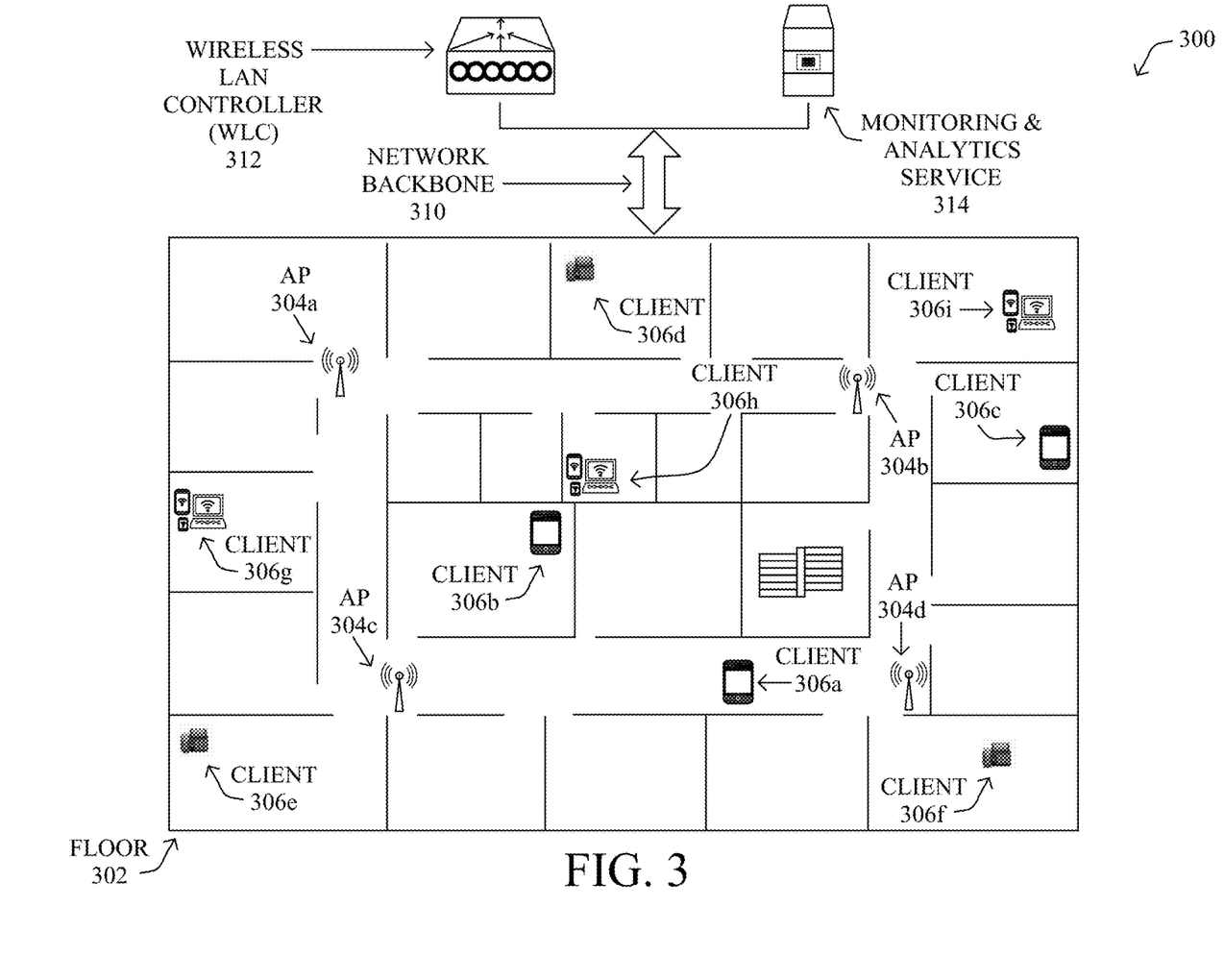
FIG. 3 illustrates an example wireless network.

FIG. 3 illustrates an example wireless network 300, according to various embodiments. Wireless network 300 may be deployed to a physical location, such as floor 302 shown, and may include various infrastructure devices. These infrastructure devices may include, for example, one or more access points (APs) 304 that provide wireless connectivity to the various wireless clients 306 distributed throughout the location. For illustrative purposes, APs 304a-304d and clients 306a-306i are depicted in FIG. 3. However, as would be appreciated, a wireless network deployment may include any number of APs and clients.

A network backbone 310 may interconnect APs 304 and provide a connection between APs 304 and any number of supervisory devices or services that provide control over APs 304. For example, as shown, a wireless LAN controller (WLC) 312 may control some or all of APs 304a-304d, by setting their control parameters (e.g., max number of attached clients, channels used, wireless modes, etc.). Another supervisory service that oversees wireless network 300 may be a monitoring and analytics service 314 that measures and monitors the performance of wireless network 300 and, if so configured, may also adjust the operation of wireless network 300 based on the monitored performance (e.g., via WLC 312, etc.). Note that service 314 may be implemented directly on WLC 312 or may operate in conjunction therewith, in various implementations.

Network backbone 310 may further provide connectivity between the infrastructure of the local network and a larger network, such as the Internet, a Multiprotocol Label Switching (MPLS) network, or the like. Accordingly, WLC 312 and/or monitoring and analytics service 314 may be located on the same local network as APs 304 or, alternatively, may be located remotely, such as in a remote datacenter, in the cloud, etc. To provide such connectivity, network backbone 310 may include any number of wired connections (e.g., Ethernet, optical, etc.) and/or wireless connections (e.g., cellular, etc.), as well as any number of networking devices (e.g., routers, switches, etc.).

The types and configurations of clients 306 in network 300 can vary greatly, ranging from powerful computing devices to any number of different types of IoT nodes/devices. For example, clients 306a-306i may include, but are not limited to, wireless sensors, actuators, thermostats, relays, mobile phones, other mobile devices, and the like.

As noted above, a new feature in 802.11ax is called "Target Wake Time (TWT)" that allows clients 306 and their APs 304 to negotiate specific time windows during which the client is expected to wake, in order to communicate with the AP. Such time windows can be announced by a client 306 and accepted by the AP 304, or otherwise dictated by the AP 304. This feature allows the AP 304 to manage the contention in a single basic service set (BSS) by splitting the time resources among the clients 306 that would otherwise attempt to access the medium all at the same time, reducing the media access control (MAC) efficiency. At the same time, the TWT mechanism provides power saving opportunities for the clients 306. Because of the above advantages of the TWT mechanism, it is one that is expected to be used heavily in 802.11ax applications.

TWT negotiations between an AP 304 and a client 306 can be performed in a number of ways. In some cases, a client 306 may send a TWT request to the AP 304 that indicates its desired TWT time windows or, alternatively, the TWT schedule can be dictated by the AP 304. In all of these cases, common end results of the typical TWT negotiation are:
1. The AP 304 and the client 306 reach consensus after a significant number of frame exchanges.
2. The AP 304 and the client 306 fail to reach consensus and the client either roams or tries to re-start the process (repeat tries).

In both of the above outcomes, when the number of frame exchanges increases, there will also be an adverse impact on the client's battery life.

Machine Learning-Based Target Wake Time Negotiation Optimization for Wireless Networks The techniques herein introduce a machine learning-based framework that is able to learn from the patterns of past TWT negotiations and predict the likelihood of future successes for different sets of TWT parameters. In further aspects, the techniques herein may also leverage information about the client and/or the network, to dynamically control how aggressively the access point can potentially negotiate with the client.

Specifically, according to one or more embodiments of the disclosure as described in detail below, a device in a wireless network receives a target wake time (TWT) request from a wireless client. The device computes TWT parameters based on the received request. The device predicts, using the computed TWT parameters as input to a machine learning model, whether the computed TWT parameters will be accepted by the wireless client. The device provides the computed TWT parameters to the wireless client, based on a prediction by the machine learning model that the client will accept the computed TWT parameters.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein.

Operationally, the techniques herein introduce a machine learning-based framework for achieving the closest consensus to the TWT parameters desired by a client, while minimizing the likelihood of a failed TWT negotiation and reducing the number of frame exchanges required to achieve consensus between the client and AP. While doing so, it is important that the network avoid being too conservative in its negotiations, as this can potentially cause disruptions or interfere with other scheduled traffic in the network. Conversely, it is equally important that the network not be too aggressive in its TWT negotiations, as doing so can lead to a greater number of frame exchanges or even failure to negotiate an acceptable TWT schedule.

It is important to note that while TWT negotiations could be an assoc-time repeat negotiation for IoT-like clients which have fairly periodic traffic, for most other station types (especially phones and other battery-operated devices which like to sleep aggressively), the setup will be done dynamically and frequently. Hence, optimizing this communication will result in significant overall improvement in WLAN performance and improved battery life for the client.

Figure 4:
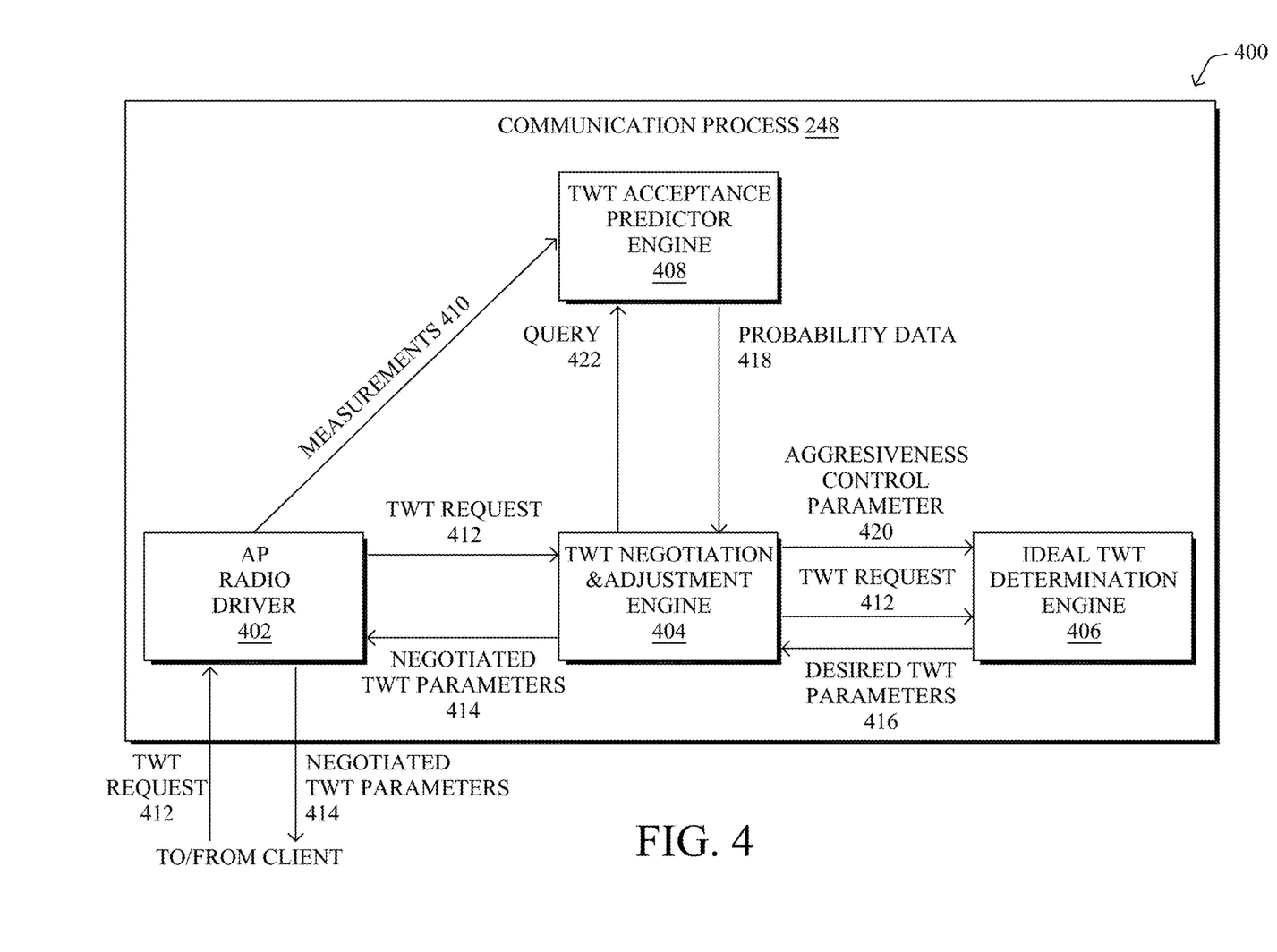
FIG. 4 illustrates an example architecture for optimizing target wake time (TWT) negotiations in a wireless network.

FIG. 4 illustrates an example architecture 400 for optimizing target wake time (TWT) negotiations in a wireless network, according to various embodiments. At the core of architecture 400 is communication process 248 which may include any or all of the following sub-modules: AP radio driver 402, TWT negotiation & adjustment engine 404, ideal TWT determination engine 406, and TWT acceptance predictor engine 408. In various embodiments, these components may be executed by an AP, a controller/supervisory for an AP (e.g., a WLC, monitoring service, etc.), or implemented in a distributed manner across these devices. In the distributed case, the devices involved can also be viewed as a single device performing the techniques herein. Further, while components 402-408 are shown, their functionalities can be combined or omitted, as desired, in various embodiments.

To begin the process, AP radio driver 402 may receive a TWT request 412 from a client that is requesting TWT scheduling. As would be appreciated, TWT request 412 may include the TWT parameters requested by the client. In turn, AP radio driver 402 may return a negotiated TWT parameters 414 that indicates an acceptance of the parameters of request 412 or counter offers. In general, the TWT parameters being negotiated via request 412 and negotiated TWT parameters 414 in response may include any or all of the following:
1. Target Wake Time—typically, this is specified in μs for which the requesting client will still be awake.
2. Wake Interval—this indicates the time interval between TWT wake periods.
3. TWT Channel—the active channel used.
4. TWT Protection—optionally, a protection mechanism such as Request to Send/Clear to Send (RTS/CTS) can also be specified, to avoid collisions.

Under the 802.11ax standard, two types of TWT agreements are also possible: 1.) Broadcast TWT agreements which are used for scheduling a group of clients and 2.) unicast TWT agreements which are agreements made with a single station, but may align with other stations. Accordingly, negotiated TWT parameters 414 may be sent as a unicast or broadcast message, depending on the situation. As would be appreciated, multiple cycles of negotiations are possible to setup a single TWT schedule, depending on the client implementation. In the worst case, the client could respond to negotiated TWT parameters 414 with a reject TWT for its parameters. Thus, the better the network is able to determine what will work for the client, the better it can negotiate, leading to fewer re-negotiations and less changes of rejections.

From a high level, architecture 400 represents a supervised machine learning framework that is able to learn from the patterns from past TWT negotiations and use these learned patterns to predict the likelihood of future negotiation successes. Further, architecture 400 may use operating conditions from the WLAN and/or client-specific parameters (e.g., measurements 410), to dynamically determine how aggressively communication process 248 can potentially negotiate with the client. Specifically, communication process 248 provides the following capabilities:

- A supervisory feed-forward neural network is used with one or more hidden layers to predict the likelihood of success of TWT negotiations with a certain number of frame exchanges.
- For understanding of each of these patterns, communication process 248 may assess features/measurements 410 like type of clients, features describing the client such as RF characteristics, type, location, QoS requirements, client mobility, client negotiation strategy (level of aggressiveness), current time of the day, how long the client has been active, possible on-board sensor readings like battery level, or the like.
- The framework also determines the conservativeness with which it needs to negotiate with the client and use that as a factor in controlling the TWT parameters. Communication process 248 determines the conservativeness based on the operating conditions in the WLAN such as residual airtime, channel bandwidth, number of clients, and interference levels.
- The process of the framework is fast and provides the computation loop without having any over the air packet exchanges. Once this is done, it presents these parameters to the radio, via AP radio driver 402, which will send them over the air.
- Based on the negotiation results (successful or failed), the machine learning model is updated on-the-fly, or from time-to-time based on records, to adapt to traffic/network/environment variations.

The 802.11ax standard defines the TWT parameters requested by the client as follows:

The awake duration: TWT_DWELL_VAR_REQ×256 µs=TWT_SP_DWELL_REQ µs

The time interval between start of TWT SPs is: TWT_SP_INTVL_REQ µs

TWT Start time (TWT_SP_START_OFFSET)—The start time when the first TWT SP starts.

Thus, TWT_DEF is defined herein as a tuple of these 3 values:

TWT_DEF={TWT_DWELL_VAR_REQ,TWT_SP_INTVL_REQ, TWT_SP_START_OFFSET}.

It is important to note that this is just one embodiment. In another embodiment, the TWT can be defined with more or fewer parameters for the purposes of prediction and negotiation.

In response to receiving TWT request 412, AP radio driver 402 may forward the requested 412 to TWT negotiation & adjustment engine 404. Generally, engine 404 is responsible for looking at TWT request parameters 414 from the client and working with TWT acceptance predictor engine 408 and ideal TWT determination engine 406, to decide which TWT parameters would be in the best interest of the AP (e.g., based on the current communication schedule of the AP, the clients of the AP, etc.).

As a simple example, if there are few clients associated with the AP and are passing traffic sporadically, TWT negotiation & adjustment engine 404 may decide to negotiate aggressively with the client by choosing the parameters that are solely in the best interest of the AP. On the other hand, if the AP is very busy (e.g., with high channel utilization) with a large number of clients negotiating TWT, TWT negotiation & adjustment engine 404 may choose to lessen the aggressiveness of the parameter computations.

The operation of communication process 248 may proceed as follows:

First, TWT negotiation & adjustment engine 404 initializes an aggressiveness control parameter to its most aggressive setting. For example, engine 404 may initially set Aggressiveness_control=5 (most aggressive setting). In this case, ideal TWT determination engine 406 will select TWT parameters that are the most ideal from the AP's perspective (e.g., scheduling, grouping, etc.), which may or may not be suitable from the client's perspective.

Next, when TWT negotiation & adjustment engine 404 receives TWT request 412 from the client via AP radio driver 402, it may send request 412 onward to ideal TWT determination engine 406, along with the current aggressiveness control parameters 420. For example, TWT negotiation & adjustment engine 404 may send the TWT parameter tuple TWT_CL and Aggressiveness_control=5 to ideal TWT determination engine 406.

In various embodiments, ideal TWT determination engine 406 is configured to compute the optimal TWT parameters for the negotiation, based on TWT request 412 (e.g., the parameters requested by the client) and aggressiveness control parameter 420. For example, when Aggressiveness_control=5 (e.g., the highest setting), the TWT_AP computed by engine 406 will be optimized to suit the operation of the AP. However, this could also significantly differ from the TWT_CL specified in TWT request 412 from the client. On the other end of the spectrum, if Aggressiveness_control reaches 1 (e.g., the lowest setting), engine 406 will just accept the TWT_CL specified by the client in request 412 and accept them from the AP perspective by making TWT_AP=TWT_CL.

Ideal TWT determination engine 406 returns its computed TWT parameters to TWT negotiation & adjustment engine 404 as desired TWT parameters 416. In turn, TWT negotiation & adjustment engine 404 may send a query 422 to TWT acceptance predictor engine 408 that includes the parameters 416 computed by engine 406 and the parameters requested by the client from request 412, to predict the likelihood of the client accepting the TWT parameters computed by ideal TWT determination engine 406. For example, TWT negotiation & adjustment engine 404 may present both the TWT_CL (e.g., the parameters from request 412) and TWT_AP (e.g., the parameters 416 computed by engine 406) to TWT acceptance predictor engine 408.

In various embodiments, TWT acceptance predictor engine 408 includes a machine learning model configured to predict how the client will react to the TWT parameters computed by ideal TWT determination engine 406. For example, TWT acceptance predictor engine 408 may compute the probability vector of TWT_AP as being {ACCEPT_PROB, REJECT_PROB, Re-NEGOTIATE_PROB}. In other words, TWT acceptance predictor engine 408 may predict the probabilities of the client accepting the offered TWT parameters, rejecting the TWT parameters outright, or attempting to re-negotiate the parameters with the AP. In turn, TWT acceptance predictor engine 408 may provide this probability data 418 to TWT negotiation & adjustment engine 404 for further analysis.

According to various embodiments, TWT negotiation & adjustment engine 404 may either send the TWT parameters 416 computed by ideal TWT determination engine 406 onward to the client as negotiated TWT parameters 414 or initiate a recomputation by ideal TWT determination engine 406 using a different aggressiveness control parameter 420, depending on the probability data 418 computed by TWT acceptance predictor engine 408 for the currently computed parameters. Thus, communication process 248 may iteratively attempt to find TWT parameters that are likely to be accepted by the client, while still attempting to compute parameters that favor the AP.

By way of example, TWT negotiation & adjustment engine 404 may assess whether (TWT_AP(REJECT_PROB)>THRESH_REJECT_PROB). In other words, if probability data 418 indicates that the probability of the client rejecting the TWT parameters computed by ideal TWT determination engine 406 exceeds a predefined threshold, TWT negotiation & adjustment engine 404 may lower aggressiveness control parameter 420, to give more consideration to the TWT parameters requested by the client. Communication process 248 may iteratively perform this processing until the predicted probability of rejection is below the threshold or the aggressiveness control parameter 420 has been fully lowered (e.g., engine 406 accepts the client's proposed parameters) and the resulting parameters returned to the client.

In some embodiments, TWT acceptance predictor engine 408 may also compute the probability of the client requesting re-negotiation and include this prediction in probability data 418. In turn, TWT negotiation & adjustment engine 404 may also consider the current radio airtime usage by the radio associated with AP radio driver 402, to determine whether to return the currently computed parameters 416 to the client. Indeed, if the radio airtime usage is below a threshold (e.g., CURRENT_RAD_AIRTIME_USAGE<THRESH_AIRTIME_USAGE), engine 404 may determine that the network can afford to re-negotiate with the client, if need be, and provide the computed parameters 416 to the client as negotiated parameters 414.

Similar to when the probability of rejection exceeds a predefined threshold, TWT negotiation & adjustment engine 404 may also trigger recomputation of parameters 416 using a lower aggressiveness control parameter 420 based on the probability of re-negotiation indicated in probability data 418. For example, if the probability of re-negotiation exceeds its own defined threshold and/or the usage of the radio exceeds a usage threshold, TWT negotiation & adjustment engine 404 may lower aggressiveness control parameter 420 and request recomputation of TWT parameters 416 from engine 406.

As would be appreciated, the iterative nature of the TWT computations by communication process 248 can greatly reduce the chances of the client rejecting the TWT parameters offered by the AP, as well as reducing the number of communicated frames due to re-negotiations.

The machine learning model of TWT acceptance predictor engine 408 may be implemented in any number of suitable ways, according to various embodiments. In general, this model looks at the TWT parameters 416 computed by ideal TWT determination engine 406, while also potentially taking into account measurements 410, to make its predictions. For example, measurements 410 may indicate the current operating conditions of the client, the traffic conditions at the client (e.g., WMM ACs and their corresponding loads), client type information, the frequency of TWT negotiations, or the like. Note that these are examples of what would be used by the ML component and the actual set of parameters could encompass a wider set of parameters.

TWT acceptance predictor engine 408 can use any suitable supervised learning algorithm, such as a regression-based mechanism, to make its predictions. For example, one suitable model would be a multi-layer neural network. This comes from the fact that methods such as decision tree-based models require features that are self evident and they do not work with continuous features. In further embodiments, engine 408 could instead use a linear model, such as an SVM. However, linear models are typically more useful for a large number of features, while the model of engine 408 will typically require less than ten feature inputs.

Figure 5:
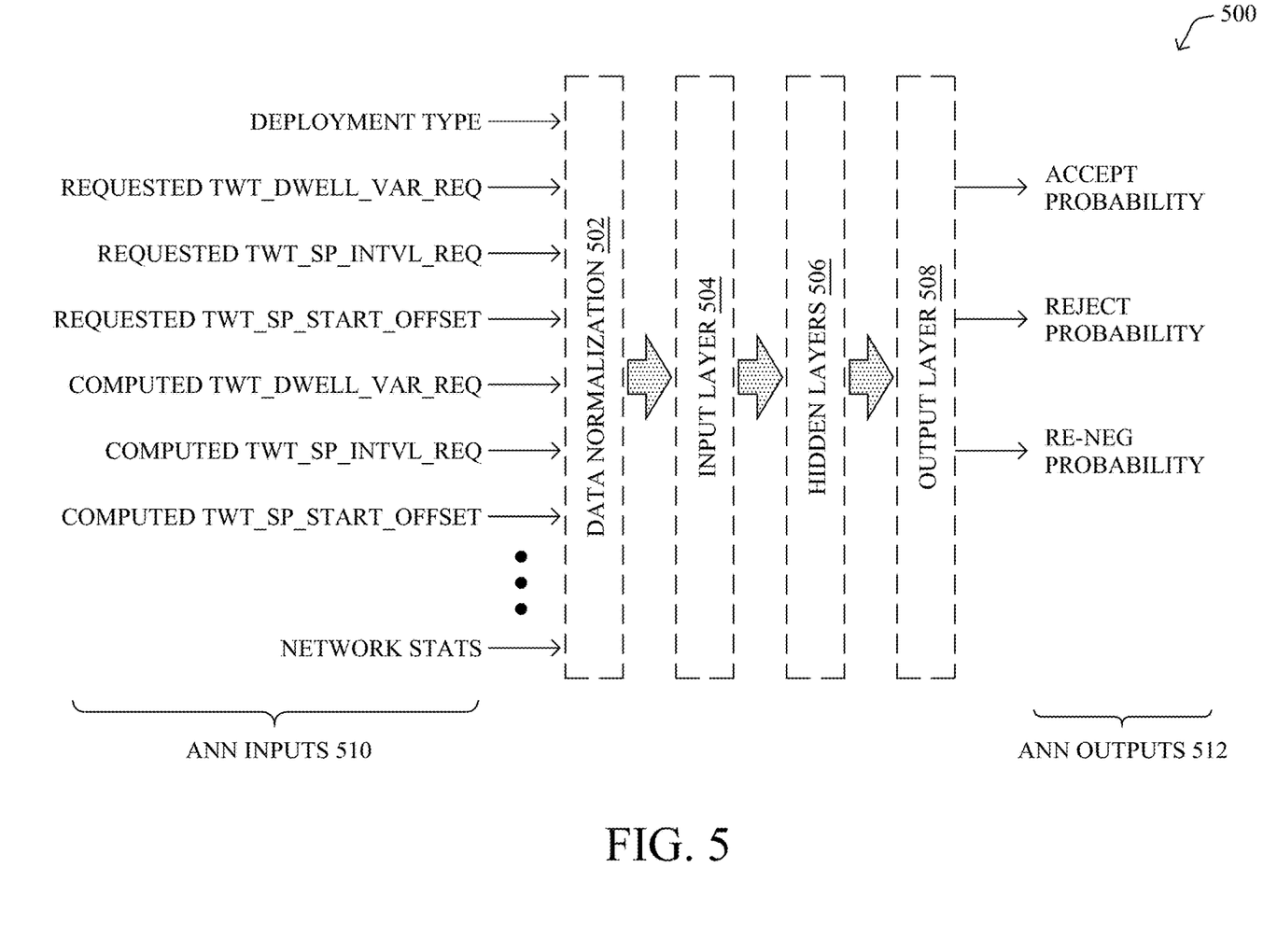
FIG. 5 illustrates an example artificial neural network (ANN) for predicting whether a client will accept TWT parameters from an access point.

FIG. 5 illustrates an example artificial neural network (ANN) 500 for predicting whether a client will accept TWT parameters from an access point, according to various embodiments. More specifically ANN 500 may be a feed-forward ANN that uses sigmoid activation functions and calculates these functions using back propagation. Alternatively, in another embodiment, a convolutional neural network with deep learning may also be suitable for making these predictions.

As shown, ANN 500 may take as input any number of inputs 510 such as the deployment type, the TWT parameters requested by the client, the TWT parameters computed by ideal TWT determination engine 406, as well as any number of other network statistics/measurements (e.g., the AP's load, etc.). In turn, ANN 500 may perform data normalization 502 on these inputs 510, and process them through an input layer 504, any number of hidden layers 506, and finally through an output layer 508, to produce outputs 512 comprising the probabilities associated with the different reactions that the client could have to the proposed TWT parameters.

For online training of ANN 500, TWT acceptance predictor engine 408 in FIG. 4 may initially be disabled. This results in communication process 248 using the standard mode of TWT negotiations. In turn, communication process 248 may record all parameters of the client requests, AP responses, and client reactions, which can then be used as a training dataset per client. More specifically, all requested parameters that initially sent by a client may be associated with the desired parameters of AP plus final parameters as outcome of the negotiations (that is, <prob(accept),prob(rej),prob(re-neg)> is set to <1,0,0>, <0,1,0>, or <0,0,1> for cases of accept, reject, and re-negotiate, respectively). This set is updated when the amount of negotiations is more than expected (e.g., the observed reactions of the client do not match the predictions) and ANN 500 may reenter training to be adjusted with the changes in the environment. In this case, the model learns as it goes and based on past predictions, as time goes by, ANN 500 will get better at predicting outcomes.

In the normal mode of operation of ANN 500, the probability of acceptance of computed TWT parameters (at AP) by client is predicted based on the trained weights associated with its various layers. The ANN outputs 512 are then provided back to the negotiation and adjustment engine (e.g., engine 404 in FIG. 4 as probability data 418), allowing the engine to decide to either recompute the parameters offered by the AP or offer the current set of parameters to the client.

In another embodiment, it may also be possible to use game theory to come up with an approach for computing TWT parameters to be offered to a client. For instance, determining the Nash equilibrium such that it maximizes the utility function (e.g., it improves the QoS performance of the client, limits the negotiations to a minimum while achieving the best possible TWT parameters from the APs perspective, etc.), could also be used in lieu of a prediction model.

Figure 6:
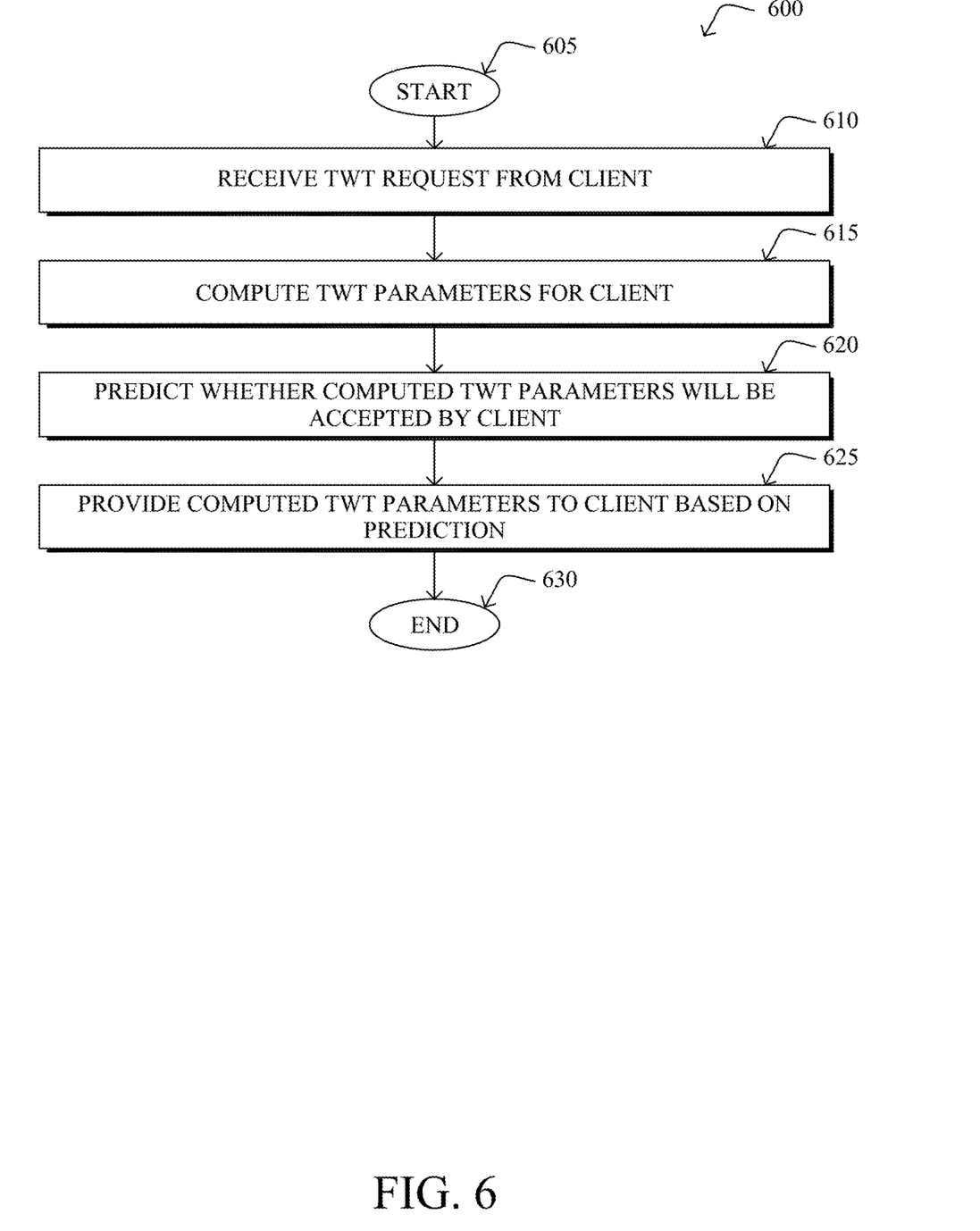
FIG. 6 illustrates an example simplified procedure for optimizing TWT negotiations in a wireless network.

FIG. 6 illustrates an example simplified procedure 600 for optimizing TWT negotiations in a wireless network, in accordance with one or more embodiments described herein. For example, a non-generic, specifically configured device (e.g., device 200) may perform procedure 600 by executing stored instructions (e.g., process 248), such as an AP, a controller or other supervisor of an AP, or a combination thereof. The procedure 600 may start at step 605, and continues to step 610, where, as described in greater detail above, the device may receive a TWT request from a wireless client. Such a request may specify, for example, start or end times for sleep modes and/or awake modes of the client, durations of the sleep and/or awake modes, or any other information that the device can use to negotiate TWT operation with the client.

At step 615, as detailed above, the device may compute TWT parameters based on the received request. Similar to those parameters of the received request, the computed TWT parameters may be indicative of one or more of: an awake duration for the wireless client, a time interval between TWT service periods (SPs), or a TWT start time. Typically, this computation will be based on the operational state of the AP, such as the current schedules of the various clients of the AP, the number of clients of the AP, etc. Indeed, it may not be possible for the AP to fully accommodate the TWT parameters requested by the client, in view of the other operations of the AP. In various embodiments, the device may also use a measure of TWT negotiation aggressiveness to control whether the computed TWT parameters are optimized more for the client or for the device. For example, at its most aggressive setting, the device may compute the TWT parameters considering only the needs of the AP. Conversely, at its least aggressive setting, the device may simply verify whether it can accommodate the parameters of the request from the client.

At step 620, the device may predict, using the computed TWT parameters as input to a machine learning model, whether the computed TWT parameters will be accepted by the wireless client, as described in greater detail above. For example, the model may take as input the TWT parameters from the request received in step 610 and the TWT parameters computed in step 615. Such a model may also take into account, for example, at least one of: radio frequency (RF) characteristics of the wireless client, a type associated with the client, a location associated with the client, a mobility of the client, quality of service (QoS) requirements of the client, or a time of day, to predict a probability of the client accepting the parameters computed in step 615.

At step 625, as detailed above, the device may provide the computed TWT parameters to the wireless client, based on a prediction by the machine learning model that the client will accept the computed TWT parameters. Notably, if the probability of the client accepting the parameters computed in step 615 is predicted by the model to be above a predefined threshold, the device may provide the computed TWT parameters to the client. In further embodiments, if the predicted probability is below the threshold, the device may lower its measure of TWT negotiation aggressiveness, to bring its computed TWT parameters closer to those requested by the client. This process may repeat any number of times, until the computed parameters are predicted to be acceptable to the client or the device reaches its least aggressive settings. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a machine learning-based framework for optimizing TWT negotiations between a wireless client and an AP. By predicting whether the client will accept the AP's TWT parameters, the framework can help the client and AP to reach consensus sooner, thereby reducing the chances of negotiations breaking down or consuming additional resources.

While there have been shown and described illustrative embodiments that provide for negotiating TWT parameters, it is to be understood that various other adaptations and modifications may be made within the spirit and scope of the embodiments herein. For example, while certain protocols are shown, such as 802.11ax, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not not to otherwise limit the scope of the embodiments herein. Therefore, it is the object of the appended claims to cover all such variations and modifications as come within the true spirit and scope of the embodiments herein.

What is claimed is:

1. A method comprising:
  receiving, at a device in a wireless network, a target wake time (TWT) request from a wireless client;
  computing, by the device, TWT parameters based on the received request and an aggressiveness control parameter that is controlled by the device, wherein the aggressiveness control parameter controls whether to optimize the TWT parameters more for the wireless client or for the device;
  predicting, by the device and using the computed TWT parameters as input to a machine learning model, whether the computed TWT parameters will be accepted by the wireless client; and
  providing, by the device, the computed TWT parameters to the wireless client, based on a prediction by the machine learning model that the client will accept the computed TWT parameters.

2. The method as in claim 1, wherein the computed TWT parameters are indicative of one or more of: an awake duration for the wireless client, a time interval between TWT service periods (SPs), or a TWT start time.

3. The method as in claim 1, wherein the machine learning model comprises an artificial neural network (ANN).

4. The method as in claim 1, wherein predicting, using the computed TWT parameters as input to a machine learning model, whether the computed TWT parameters will be accepted by the wireless client comprises:
assessing at least one of: radio frequency (RF) characteristics of the wireless client, a type associated with the client, a location associated with the client, a mobility of the client, quality of service (QoS) requirements of the client, or a time of day.

5. The method as in claim 1, wherein predicting, using the computed TWT parameters as input to a machine learning model, whether the computed TWT parameters will be accepted by the wireless client further comprises:
predicting that the computed TWT parameters will be rejected by the client;
adjusting the aggressiveness control parameter; and
recomputing the TWT parameters based on the adjusted aggressiveness control parameter, wherein the TWT parameters provided to the wireless client comprise the recomputed TWT parameters.

6. The method as in claim 1, further comprising:
computing second TWT parameters for a second wireless client;
predicting, using the machine learning model, that the second wireless client will initiate TWT re-negotiation if provided the second TWT parameters; and
providing the second TWT parameters to the second wireless client when usage of a radio of the device is below a predefined threshold.

7. The method as in claim 1, wherein the device is an access point for the wireless network.

8. The method as in claim 1, wherein the device is a supervisory controller for an access point.

9. An apparatus, comprising:
one or more network interfaces to communicate with a network;
a processor coupled to the network interfaces and configured to execute one or more processes; and
a memory configured to store a process executable by the processor, the process when executed configured to:
receive a target wake time (TWT) request from a wireless client;
compute TWT parameters based on the received request and an aggressiveness control parameter that is controlled by the device, wherein the aggressiveness control parameter controls whether to optimize the TWT parameters more for the wireless client or for the device;
predict, using the computed TWT parameters as input to a machine learning model, whether the computed TWT parameters will be accepted by the wireless client; and
provide the computed TWT parameters to the wireless client, based on a prediction by the machine learning model that the client will accept the computed TWT parameters.

10. The apparatus as in claim 9, wherein the computed TWT parameters are indicative of one or more of: an awake duration for the wireless client, a time interval between TWT service periods (SPs), or a TWT start time.

11. The apparatus as in claim 9, wherein the machine learning model comprises an artificial neural network (ANN).

12. The apparatus as in claim 9, wherein the apparatus predicts, using the computed TWT parameters as input to a machine learning model, whether the computed TWT parameters will be accepted by the wireless client by:
assessing at least one of: radio frequency (RF) characteristics of the wireless client, a type associated with the client, a location associated with the client, a mobility of the client, quality of service (QoS) requirements of the client, or a time of day.

13. The apparatus as in claim 9, wherein the apparatus predicts, using the computed TWT parameters as input to a machine learning model, whether the computed TWT parameters will be accepted by the wireless client further by:
predicting that the computed TWT parameters will be rejected by the client;
adjusting the aggressiveness control parameter; and
recomputing the TWT parameters based on the adjusted aggressiveness control parameter, wherein the TWT parameters provided to the wireless client comprise the recomputed TWT parameters.

14. The apparatus as in claim 9, wherein the process when executed is further configured to:
compute second TWT parameters for a second wireless client;
predict, using the machine learning model, that the second wireless client will initiate TWT re-negotiation if provided the second TWT parameters; and
provide the second TWT parameters to the second wireless client when usage of a radio of the apparatus is below a predefined threshold.

15. The apparatus as in claim 9, wherein the apparatus is an access point for the wireless network.

16. The apparatus as in claim 9, wherein the apparatus is a supervisory controller for an access point.

17. A tangible, non-transitory, computer-readable medium storing program instructions that cause a device in a wireless network to execute a process comprising:
receiving, at the device in the wireless network, a target wake time (TWT) request from a wireless client;
computing, by the device, TWT parameters based on the received request and an aggressiveness control parameter that is controlled by the device, wherein the aggressiveness control parameter controls whether to optimize the TWT parameters more for the wireless client or for the device;
predicting, by the device and using the computed TWT parameters as input to a machine learning model, whether the computed TWT parameters will be accepted by the wireless client; and
providing, by the device, the computed TWT parameters to the wireless client, based on a prediction by the machine learning model that the client will accept the computed TWT parameters.

* * * * *

UNITED STATES PATENT AND TRADEMARK OFFICE
CERTIFICATE OF CORRECTION

PATENT NO. : 10,925,001 B2
APPLICATION NO. : 16/407447
DATED : February 16, 2021
INVENTOR(S) : Gautam Dilip Bhanage et al.

It is certified that error appears in the above-identified patent and that said Letters Patent is hereby corrected as shown below:

In the Specification

Column 4, Line 21, please amend as shown:
devices, but rather the ability to connect "objects" in Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*